(No Model.) 3 Sheets—Sheet 1.
D. MacEACHRAN.
APPARATUS FOR SEPARATING IRON FROM CHARCOAL, &c.
No. 289,545. Patented Dec. 4, 1883.
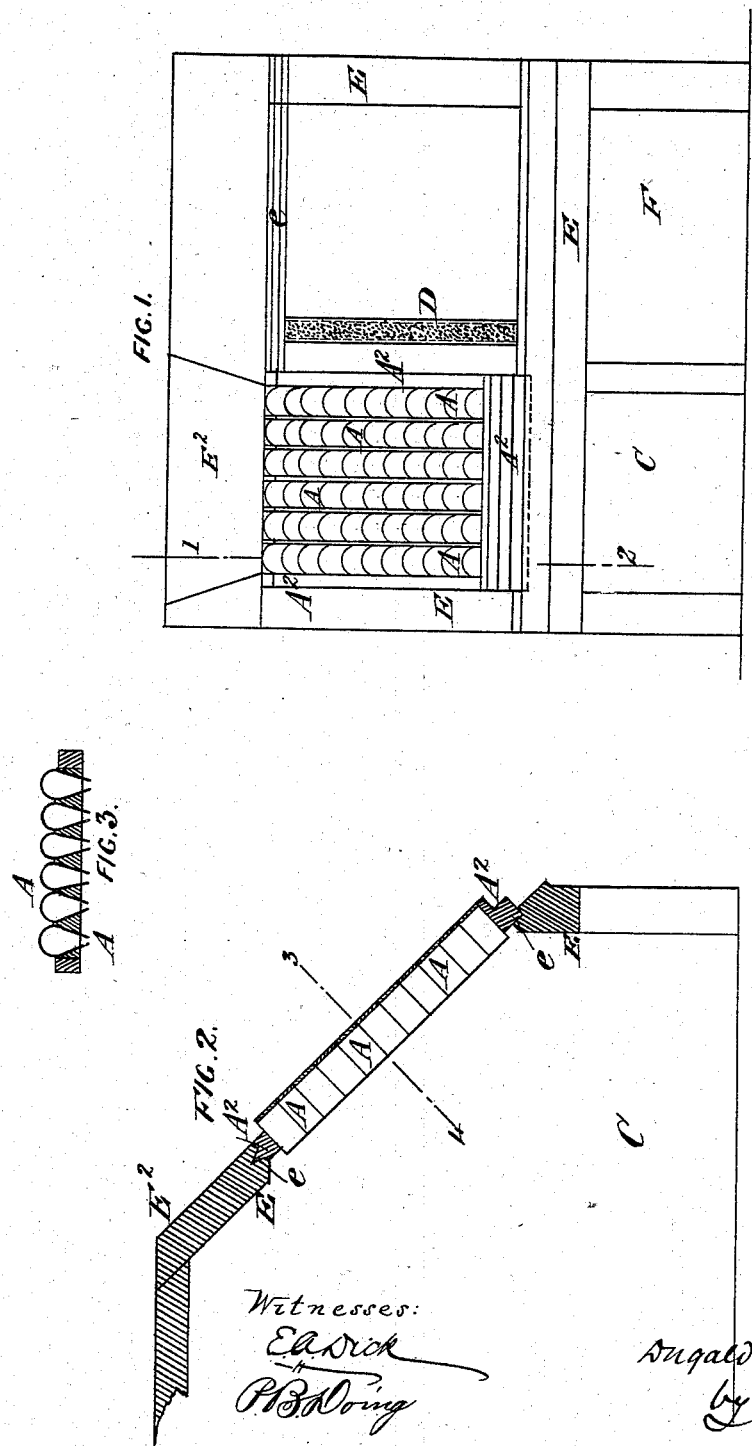

(No Model.) 3 Sheets—Sheet 2.
D. MacEACHRAN.
APPARATUS FOR SEPARATING IRON FROM CHARCOAL, &c.
No. 289,545. Patented Dec. 4, 1883.
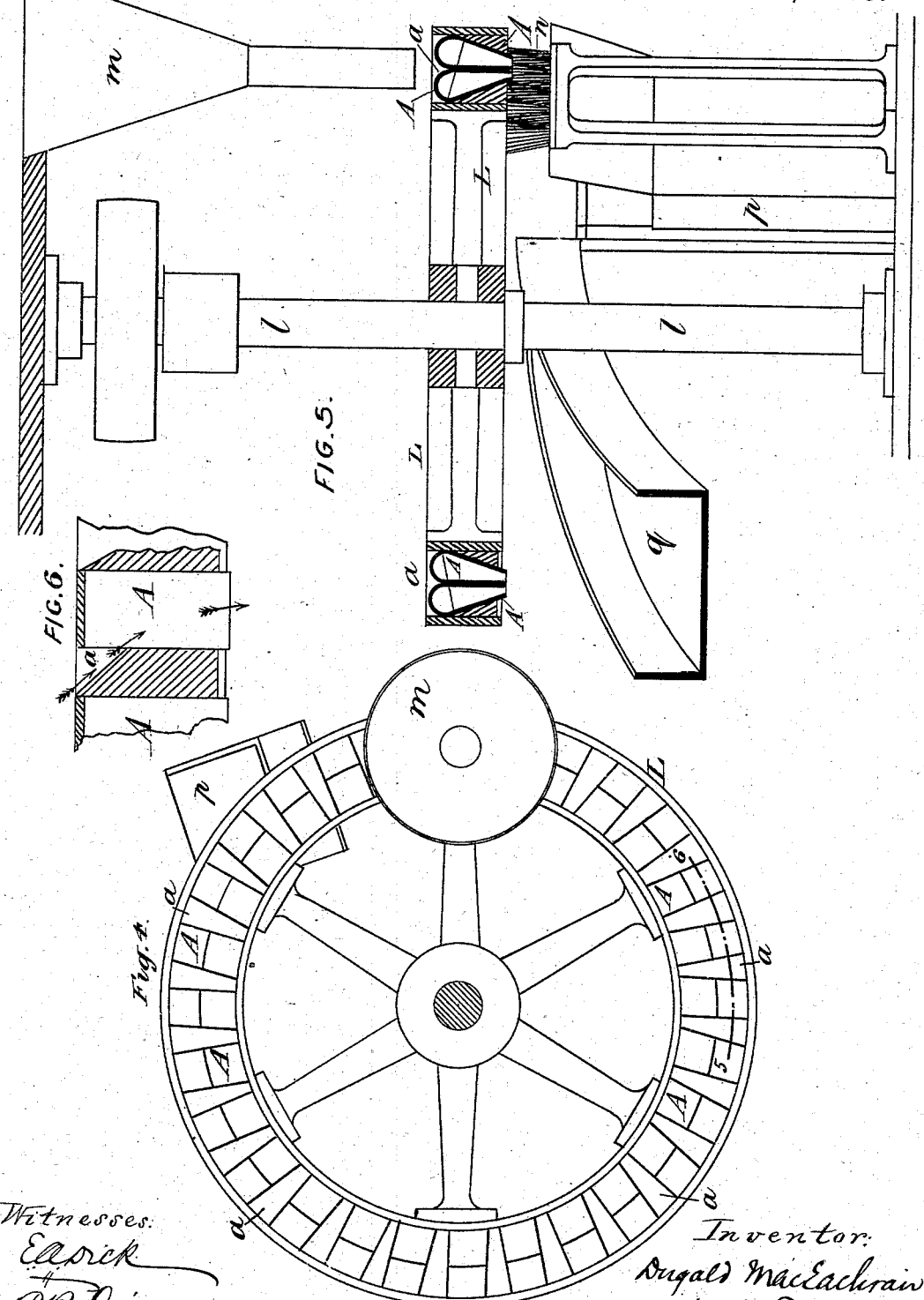

(No Model.)
D. MAC EACHRAN.
APPARATUS FOR SEPARATING IRON FROM CHARCOAL, &c.
No. 289,545. Patented Dec. 4, 1883.
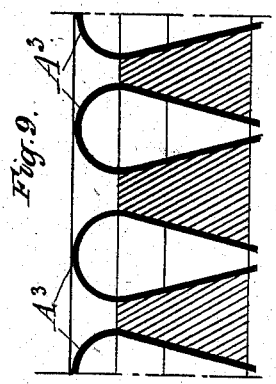
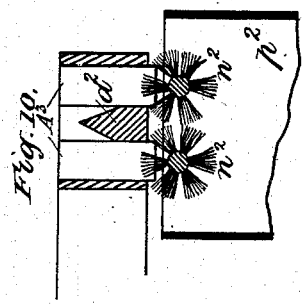
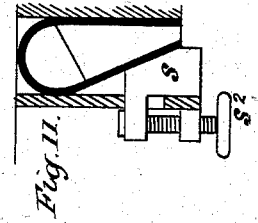
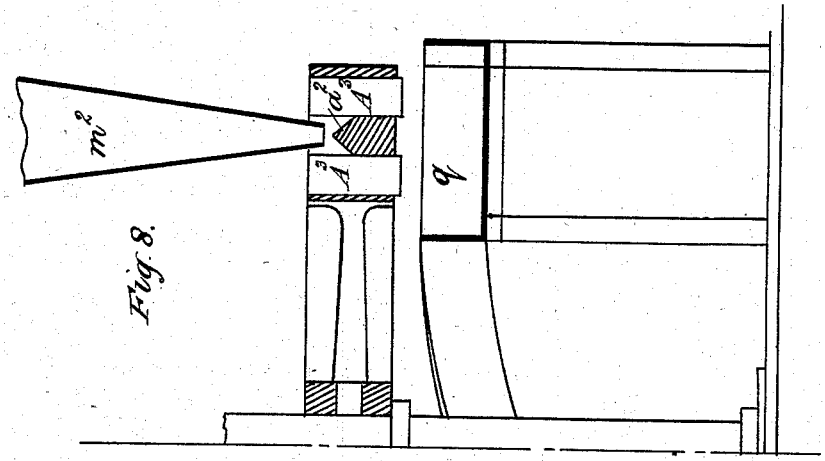
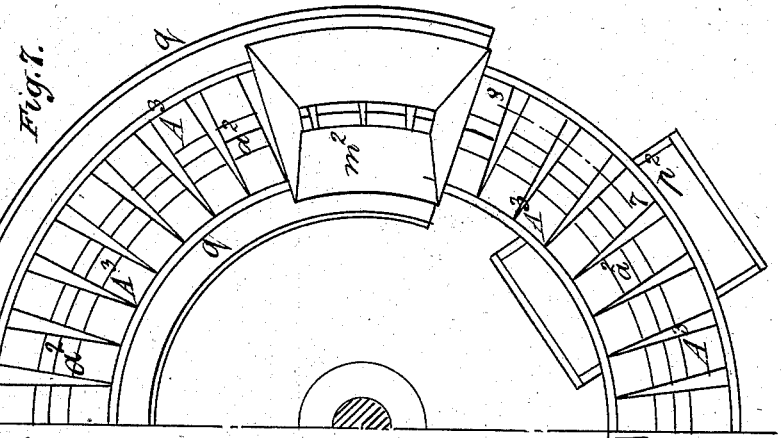

UNITED STATES PATENT OFFICE.

DUGALD MacEACHRAN, OF GREENOCK, COUNTY OF RENFREW, SCOTLAND.

APPARATUS FOR SEPARATING IRON FROM CHARCOAL, &c.

SPECIFICATION forming part of Letters Patent No. 289,545, dated December 4, 1883.

Application filed December 20, 1881. (No model.) Patented in England May 4, 1881, No. 1,923; in France November 4, 1881, No. 145,658; in Germany November 19, 1881, No. 18,598; in Belgium December 31, 1881, No. 56,638, and in Austria March 16, 1882, No. 1,677.

*To all whom it may concern:*

Be it known that I, DUGALD MACEACH-RAN, of Greenock, in the county of Renfrew, North Britain, sugar-refiner, have invented new or Improved Apparatus for Separating Iron from Charcoal and other Pulverulent Substances, as well as from liquid or semi-liquid substances, of which the following is a specification.
My said invention relates to new or improved means or apparatus for separating iron from charcoal and other pulverulent substances, as well as from liquid or semi-liquid substances, and has for its object to effect the said separation in a perfect, rapid, and convenient manner. According to the said invention, the substance containing the iron and from which the iron is to be separated is caused to pass between the poles of permanent or electro magnets, or between magnetized bars or surfaces, which are adjusted or may be adjustable nearer to or farther from each other, according to the nature of the material or the quantity of iron contained therein, or according to the state in which the iron is contained therein.

Figure 1 of the accompanying drawings represents in front elevation, Fig. 2 in transverse section on the line 1 2, Fig. 1, and Fig. 3 in transverse section on the line 3 4, Fig. 2, apparatus constructed according to my invention, wherein permanent loop-magnets A are so arranged that their poles are downward and in proximity, leaving a space between them, the said magnets being arranged in a carrier, $A^2$, in line to form a number of conduits, through which the substance from which the iron is to be separated is passed from a convenient hopper or its equivalent onto the inclined chute $E^2$, and in at the upper end of the conduits formed by the magnets, the said substance passing down the said conduits and out from between the leaves or sides of the said magnets through between the poles thereof,
the iron being attracted and retained by the said magnets, and the substance from which the iron has been separated falling or passing from between the leaves or sides and poles of the said magnets into a convenient receptacle, C, beneath. The iron adhering to the magnets is removed at intervals by a brush or brushes, or their equivalent. A convenient method of effecting this cleaning is to mount the magnet-carrier $A^2$ in grooves $e$ in the supporting-framing E, so that when the iron is to be removed the said carrier is moved to one side, and in its passage the iron is brushed from the magnets by the brush D, the said iron falling into the receptacle F. The magnets may have a backward and forward jogging motion imparted to them by any convenient means, if desired, to facilitate the passage of the material between the leaves or poles, and in place of moving the framing $A^2$ the said framing may be stationary, and the chute or receptacle F and brush beneath be moved to one side when the magnets are to be cleaned; or the magnets may be arranged in pairs or singly, or in other suitable number, around a horizontal or other wheel, or like carrier caused to revolve beneath a hopper, from which the substance from which the iron is to be separated passes between the leaves or sides and poles of the magnets, the iron being retained thereby, and the substance from which the iron has been separated falling or passing into a suitable receptacle. Fig. 4 represents in plan, and Fig. 5 in elevation with the wheel in vertical section, apparatus constructed according to this modification of my invention. A wheel, L, is fixed to the shaft $l$, and caused to revolve thereby beneath a hopper, $m$, down which the impure charcoal or other substance is fed. The said wheel L at its outer part carries a series of pairs of magnets, A, held in holders of wood or the like formed with or fixed in the wheel L. These magnets A are of a loop form, as shown at Fig. 5, and open at their lower ends, the said magnets, if in contact, being placed with like poles together; or they may have a nonconductor between them. Before each pair of magnets an inclined plane, $a$, is formed or fixed, and the other parts are filled up, so that the matter from the hopper $m$ falls down the inclined planes $a$ through the interior of the magnets A and out at the bottom thereof, as shown by the arrows in Fig. 6, which represents a section on an enlarged scale on the line 5 6, Fig. 4. A brush, $n$, brushes the iron from the magnets as the wheel revolves, and the said iron falls into the receptacle $p$.

There may be any number of pairs of magnets A around the wheel L. The said magnets may be arranged singly instead of in pairs; or they may be arranged three together or a greater number together, as desired. Figs. 7 and 8 are respectively half plan and half vertical sections of a modification of the foregoing arrangements. In this modification the magnets $A^3$ are placed at right angles to their position in the arrangement, Figs. 4, 5, and 6. Between the loops of each pair of magnets is the double-inclined plane $a^2$, upon which the material to be treated drops from the hopper $m^2$, and is by the said inclined planes directed between the loops of the magnets. The spout of the hopper $m^2$ is extended down between the magnets, as shown in Fig. 8. Fig. 9 is a section on the line 7 8, Fig. 7. With this arrangement I prefer to use rotary brushes $n^2$, as shown in Fig. 10, revolving at the upper part of a receptacle, $p^2$, for the iron detached by these brushes from the magnets. $q$ in Figs. 5, 7, and 8 represents a helical inclined plane for directing the substance passing from between the magnets to any desired place.

The hereinbefore-described forms of apparatus are more especially applicable for the separation of iron from animal charcoal; but they may also be employed for separating iron from other pulverulent substances or from liquid or semi-liquid substances.

In abstracting iron from saccharine matters the magnets may be placed in the blow-up, or in the runs from the blow-up, or at the head of the filters, or at the outlet of the filters, or in any other place that may be suitable. The charcoal may be submitted to the action of the magnets, before or after burning or reburning, at any stage before it reaches the refinery or before or during filling into the cistern or cisterns, or when being emptied therefrom, or before being reburned or during burning or reburning, or after being burned or reburned, or during cooling and after or before being taken to the cistern or cisterns or the equivalent.

In place of permanent magnets arranged as shown in the accompanying drawings, electromagnets may be used instead thereof, being placed in proximity, so that as the substance from which the iron is to be separated passes the electro-magnets the iron is thereby separated.

The brush or brushes used to detach the iron from the magnets may be either stationary or revolving.

Where electro-magnetized bars or surfaces are employed, the electric current may be discontinued at intervals, in order to detach the iron therefrom, and with these electro-magnets brushes may be used, if desired, to insure the complete detachment of the iron. The loop-magnets shown may be replaced by magnetized bars or surfaces arranged in an equivalent manner, between which the substance under treatment is passed. The distance between the poles or magnetized surfaces may be either permanently fixed or they may be adjustable; or the said poles or bars or surfaces may be hinged or otherwise connected together, so that the space between them for the passage of the substance under treatment may be adjusted as required from time to time, as may be necessary. Fig. 11 represents an arrangement for this purpose. The magnet is made so that it has a tendency to spring outward. The wedge-piece $s$ is adjusted by the screw $s^2$, so that by lowering or raising the wedge-piece the distance between the leaves can be regulated by moving the said leaves farther from or nearer to each other.

In place of the wedge $s$ and screw $s^2$, a screw may be connected to the one leaf of the magnet and adjusted by a nut on the outer side of the magnet-holder; or other equivalent means of adjustment may be adopted—such, for example, as two magnetized bars hinged together and adjusted against the pressure of a spring by a screw; but I prefer the arrangement shown in Fig. 11.

The means or apparatus described may be employed for the separation of iron from charcoal, gunpowder, plumbago, and other pulverulent substances, or from liquid or semiliquid substances from which it may be desirable to abstract iron.

I claim—

1. In apparatus for separating iron from charcoal and other pulverulent matters, or from liquid or semi-liquid matters, the combination of the magnet support or carrier, the loop-magnets or their equivalent, formed and arranged with their legs downward and converging so as to constitute receptacles with narrow open bottoms, the feed-hopper which discharges the material into the space inclosed by the magnets, and a brush for removing the metallic particles adhering to the magnet-poles, as and for the purposes hereinbefore set forth.

2. The combination of the horizontal rotating magnet-carrier wheel, the loop-magnets A, mounted therein, and arranged substantially as described, and the hopper having its outlet placed so as to discharge the material into the space inclosed by the magnets which successively pass beneath it, substantially as hereinbefore shown and set forth.

3. In apparatus for separating iron from other substances by means of loop-magnets or their equivalent, arranged substantially as hereinbefore described, the combination, with said magnets, of means, substantially as specified, whereby the poles of said magnets may be adjusted or set nearer to or farther from one another, in order to vary the width of the passage or space between said poles, as and for the purposes hereinbefore set forth.

In testimony whereof I have signed my name to this specification in the presence of two subscribing witnesses.

DUGALD MacEACHRAN. [L. S.]

Witnesses:
  WILLIAM GALLACHER,
  WILLIAM HAY NIVEN,
*Law apprentices, both of 2 Argyle Street, Greenock, Scotland.*